(No Model.)

M. W. TAYLOR.
STANCHION.

No. 419,296.  Patented Jan. 14, 1890.

Witnesses  
H. D. Nealy  
T. W. Fowler

Inventor  
Minor W. Taylor  
per A. H. Evans & Co.  
Attorneys

UNITED STATES PATENT OFFICE.

MINOR W. TAYLOR, OF WATERLOO, IOWA.

STANCHION.

SPECIFICATION forming part of Letters Patent No. 419,296, dated January 14, 1890.

Application filed July 27, 1889. Serial No. 318,876. (No model.)

*To all whom it may concern:*

Be it known that I, MINOR W. TAYLOR, a citizen of the United States, residing at Waterloo, in the county of Black Hawk and State of Iowa, have invented certain new and useful Improvements in Stanchions, of which the following is a full and clear description, reference being had to the accompanying drawings, forming a part of this specification, in which—

Figure 1:
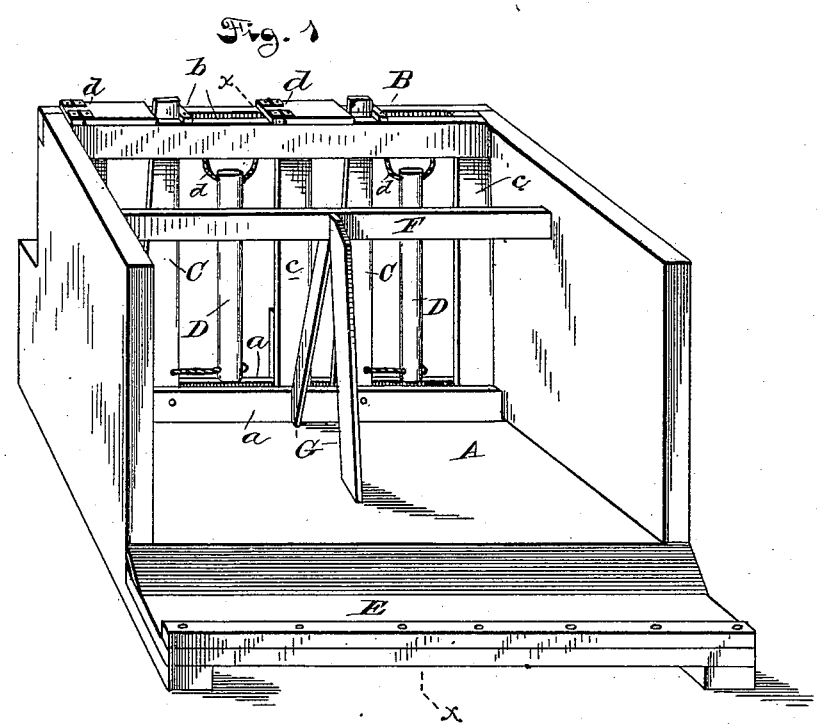
Figure 2:
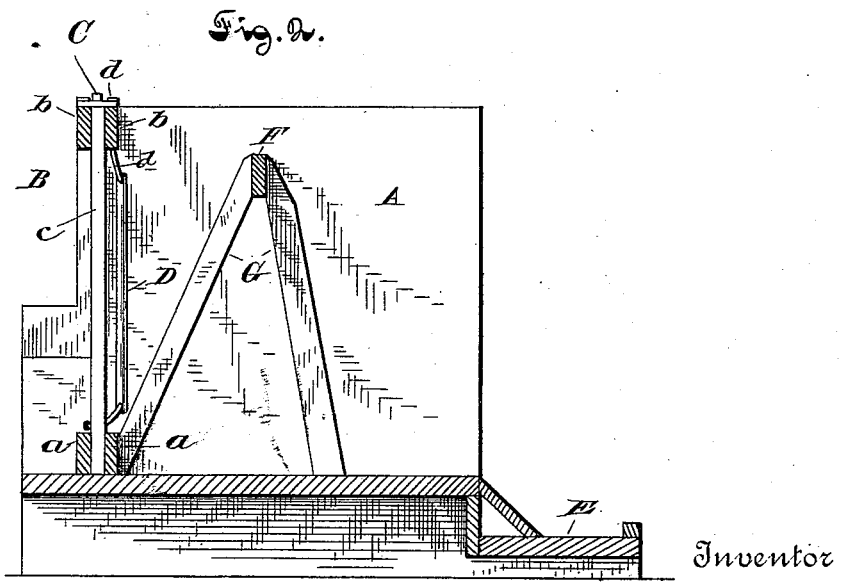

Figure 1 illustrates a stall with a stanchion and trough constructed and arranged according to my invention. Fig. 2 is a sectional view on the line X X of Fig. 1.

My invention relates especially to stanchions for stock; and it consists in the construction and combination of devices which I shall hereinafter fully describe and claim.

To enable others skilled in the art to make and use my invention, I will now describe its construction and indicate the manner in which I carry the same out.

Referring to the drawings, A represents a stall of any well-known form, having at its front the stanchion B, which consists, essentially, of two parallel spaced bars $a$, located on or near the floor of the stall, and two parallel spaced bars $b$ near the top of the stall, the said bars $a$ and $b$ having secured between them the stationary vertical bars $c$, while to the upper sides of the spaced bars $b$ are hinged stops $d$, which limit the movement of other bars C, as shown in Fig. 1. The bars C are pivoted at their lower ends between the spaced bars $a$, and their upper ends are allowed a free movement within the space formed by the two spaced bars $b$ in the usual manner. Suspended from the upper bars $b$ by loose connections—such as cords or chains $d$—are other bars D, whose lower ends are also connected with the fixed ends of the pivoted bars C. This arrangement of the bars D permits great freedom of movement of said bars, and forms practically a yielding bearing for the animal's neck, and also enables the animal to have greater freedom of movement, even to the extent of turning partially around.

At the rear of the stall is a gutter or trough E, having an inclined front wall, the said trough being designed to catch the droppings of the animal and to properly direct the discharge into this trough, so that the stall-floor may be kept clean and free from manure.

I arrange in the stall, a suitable distance from the front portion, a transverse beam F, which is let into or otherwise secured to the sides of the stall, and securely brace said beam at its center by diagonal brace rods or beams G, as shown particularly in Fig. 2. In practice the beam F will be placed at about twenty inches from the front inner wall of the stall, so that it will be in a position just in rear of the shoulders of the animal when the latter is in a standing posture, with its head between the stanchion-bars. This arrangement of the beam F is designed to cause the animal to back out of the stall far enough to let the droppings fall directly into the trough at the rear. In other words, as the animal raises its back the latter strikes the transverse beam, when the animal immediately backs from under the beam until said beam lies immediately over or slightly in rear of the shoulder. In this position the animal may discharge its offal clear of the stall-floor and immediately into the trough E. The stall is thereby kept free from the droppings and the animal kept in a cleanly condition. The two diagonal bars G, which brace the beam F, also serve as a means for practically dividing the stall into two compartments, as said brace-beams prevent the animal in one side passing to the other, thus keeping each animal in its own separate stall.

Having thus described my invention, what I claim as new, and desire to secure by Letters Patent, is—

1. The combination, with a stall having parallel spaced bars $a$ and $b$ and the pivoted bars C, of the loosely-suspended bars and the flexible connections for suspending said bars in position, substantially as described.

2. An improved stall comprising a stanchion formed of parallel spaced bars and intermediate loosely-suspended bars, a trough or gutter at the rear, a transverse beam in the stall back of the stanchion and adapted to be immediately over the back of the animal, and brace-beams for said transverse beam, adapted to divide the stall into compartments, substantially as described.

MINOR W. TAYLOR.

Witnesses:
ALBERT M. WALKER,
J. M. WALKER.